(12) United States Patent
Naik

(10) Patent No.: US 7,537,275 B2
(45) Date of Patent: May 26, 2009

(54) CUSHION FOR AN AUTOMOTIVE GRILLE

(75) Inventor: Umesh Naik, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/671,639

(22) Filed: Feb. 6, 2007

(65) Prior Publication Data
US 2007/0182209 A1 Aug. 9, 2007

Related U.S. Application Data
(60) Provisional application No. 60/765,967, filed on Feb. 7, 2006.

(51) Int. Cl.
B60R 27/00 (2006.01)
(52) U.S. Cl. .................. 296/193.1; 293/115; 180/68.6
(58) Field of Classification Search .............. 296/193.1, 296/193.11, 1.03, 207; 293/115; 180/69.22, 180/69.23, 68.6; 16/82, 86 R, 86 A; 267/136, 267/139, 140
See application file for complete search history.

(56) References Cited

U.S. PATENT DOCUMENTS

| | | | |
|---|---|---|---|
| 1,813,533 A | 7/1931 | Fischer | |
| 1,847,962 A | 3/1932 | Hicks | |
| 2,612,233 A * | 9/1952 | Newell | ................... 180/69.21 |
| 3,792,889 A | 2/1974 | Fuener et al. | |
| 4,354,566 A | 10/1982 | Yuda | |
| 4,645,250 A | 2/1987 | Bauer et al. | |
| 5,092,550 A * | 3/1992 | Bettini | ..................... 248/188.4 |
| 5,482,348 A * | 1/1996 | Mass et al. | ................... 296/207 |
| 5,682,667 A * | 11/1997 | Flagg | ........................... 29/460 |
| 5,895,089 A * | 4/1999 | Singh et al. | ................... 296/207 |
| 6,039,388 A | 3/2000 | Choi | |
| 6,088,878 A * | 7/2000 | Antonucci et al. | .......... 16/86 A |
| 6,119,306 A * | 9/2000 | Antonucci et al. | .......... 16/86 A |
| 6,318,795 B1 * | 11/2001 | Pyo | ............................. 296/207 |
| 6,507,976 B2 * | 1/2003 | Ichimaru | ........................ 16/82 |
| 6,669,274 B2 | 12/2003 | Barnard et al. | |
| 6,702,343 B1 | 3/2004 | Stull | |
| 6,923,496 B1 | 8/2005 | Pleet et al. | |
| 6,957,837 B2 | 10/2005 | Stull | |
| 2006/0064845 A1 * | 3/2006 | Fujii et al. | ..................... 16/82 |
| 2006/0288528 A1 * | 12/2006 | Dennis et al. | ................... 16/82 |

FOREIGN PATENT DOCUMENTS

| | | |
|---|---|---|
| DE | 4238725 | 5/1994 |
| EP | 0041275 A | 12/1981 |
| JP | 05213125 A | 8/1993 |

* cited by examiner

Primary Examiner—Joseph D Pape
(74) Attorney, Agent, or Firm—Gifford, Krass, Sprinkle, Anderson & Citkowski, P.C.

(57) ABSTRACT

A cushion for an automotive grille mounted in an automotive body. The cushion includes an elongated shank having an exterior thread formed along its length. The shank is adapted to be threadably mounted in a hole in the automotive body so that a portion of the shank is sandwiched in between the grille and the automotive body. The effective thickness of the cushion is controlled by rotation of the shank relative to the automotive body.

12 Claims, 2 Drawing Sheets

CUSHION FOR AN AUTOMOTIVE GRILLE

CROSS-REFERENCE TO RELATED APPLICATIONS

This application claims priority of U.S. Provisional Patent Application Ser. No. 60/765,967 filed Feb. 7, 2006, which is incorporated herein by reference.

BACKGROUND OF THE INVENTION

I. Field of the Invention

The present invention relates to a cushion for a radiator grille in an automotive vehicle.

II. Description of Material Art

Automotive grilles which extend across the front of a radiator in modern automotive vehicles are typically constructed of a somewhat flexible material, such as plastic. While such grilles are oftentimes mounted to the body of the automotive vehicle, in other cases the grille is secured to the hood which overlies the engine for the automotive vehicle. In these latter cases, the grille pivots in unison with the hood. Furthermore, a cushion is typically disposed between the bottom of the grille and the automotive body in order to improve the static rigidity/showroom quality of the grille when the hood is in the closed position while simultaneously preventing direct contact between the hard surfaces of the grille and the body which in a dynamic environment may create noise, body corrosion from paint abrasion, grille cracking from material abrasion and noise and other potential damage to the grille.

One disadvantage of these previously known grilles of the type that are mounted to the hood is that it is difficult to accurately control the spacing between the bottom of the grille and the automotive body once the hood is moved to its closed position. As such, the bottom of the grille may be spaced outwardly or forwardly from the cushion even when the hood is closed.

Any spacing between the cushion and the bottom of the grille once the hood is closed disadvantageously results in flutter of the grille during driving. Additionally, any spacing between the cushion and the bottom of the grille allows the grille to be manually deflected and potentially causing an adverse and incorrect impression of low quality construction for the vehicle.

SUMMARY OF THE PRESENT INVENTION

The present invention provides a cushion for an automotive grille which overcomes the above-mentioned disadvantages of the previously known cushions.

In brief, the cushion of the present invention comprises an elongated cylindrical shank having an external thread along at least a portion of the shank. The shank is then threadably mounted within an internally threaded hole in the automotive body. Consequently, rotation of the shank effectively changes the thickness of the cushion between the grille and the automotive body. With the hood in a closed position, the cushion is rotated until the cushion contacts the grille. In doing so, the cushion effectively eliminates flutter of the automotive vehicle while driving as well as manual deflection of the grille.

In order to facilitate adjustment of the cushion, an enlarged head is preferably provided at the forwardmost end of the shank. A noncircular recess, such as a screwdriver slot, is formed in the head. This recess is thus dimensioned to receive the head of a turning implement, such as a screwdriver, in order to position the cushion so that the enlarged head abuts against the rear of the automotive grille.

In the preferred embodiment of the invention, the grille includes two lower corners and one cushion is sandwiched in between the automotive body and each lower end of the grille. More or fewer cushions, however, may be utilized without deviation from the spirit or scope of the invention.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
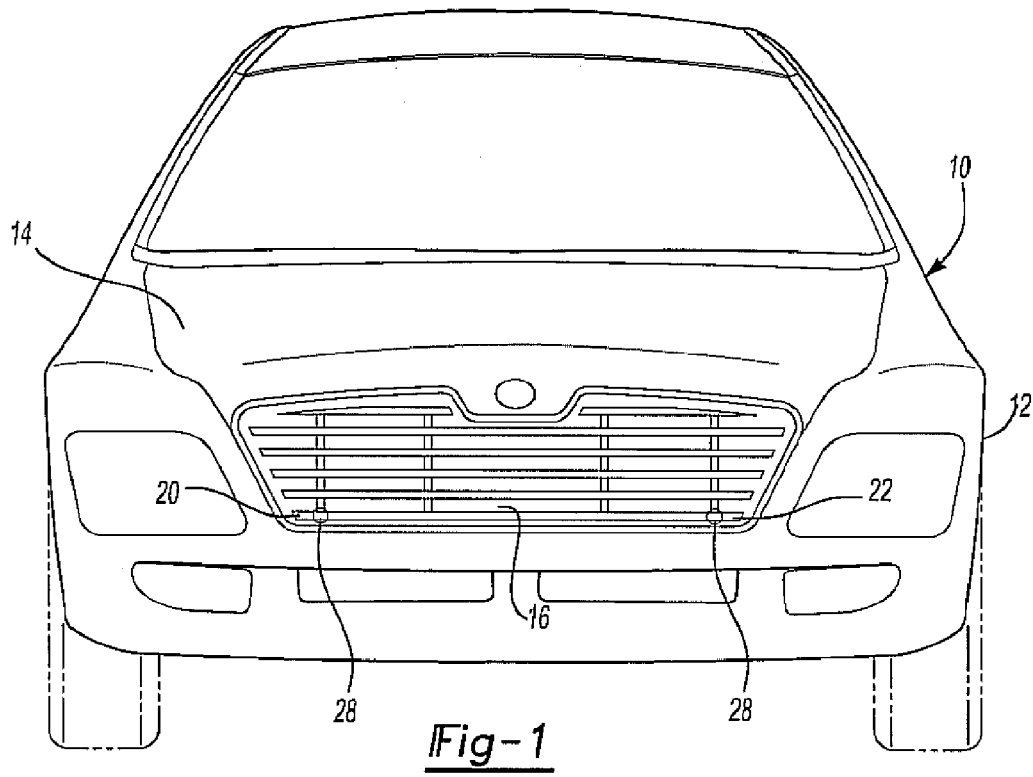
FIG. 1 is a front plan view of a preferred embodiment of the invention.
Figure 2:
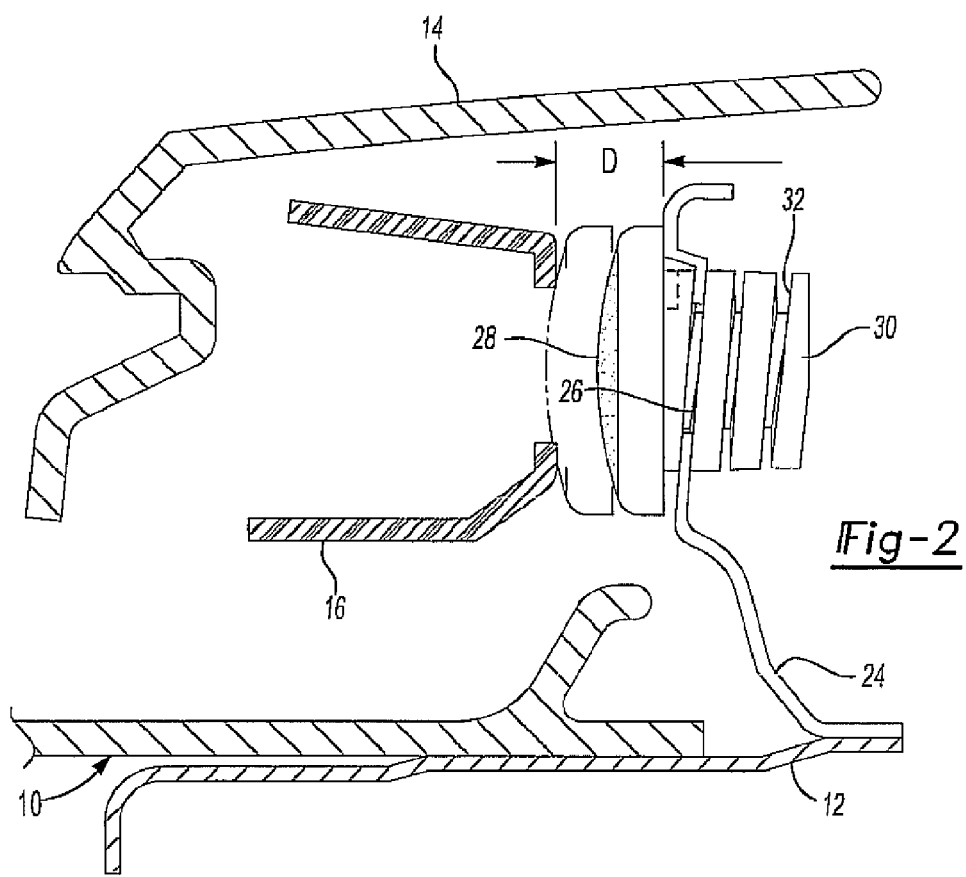
FIG. 2 is a fragmentary side partial sectional view of the preferred embodiment of the invention.

With reference first to FIGS. 1 and 2, an automotive vehicle 10 is illustrated having an automotive body 12. A hood 14 is mounted to the bottom of the body 12 and is movable between an open and a closed position in order to provide access to the vehicle engine.

Still referring to FIGS. 1 and 2, an automotive grille 16 is mounted to the hood 14 so that the grille 16 pivots in unison with the hood 14. When in its closed position, the grille 16 overlies the front of a radiator (not shown) for the vehicle 10.

The automotive grille 16 may be constructed of any conventional material. In many cases, however, the automotive grille 16 is constructed of a plastic material and thus exhibits some flexibility.

With the hood 14 in its closed position each lower corner 20 and 22 of the grille 16 is positioned forwardly of a pair of bracket 24 (FIG. 2) of the automotive body 12. Each bracket 24 of the automotive body 12 includes an internally threaded hole 26 so that each hole 26 is aligned with one of the corners 20 and 22 of the grille 16.

Figure 3:
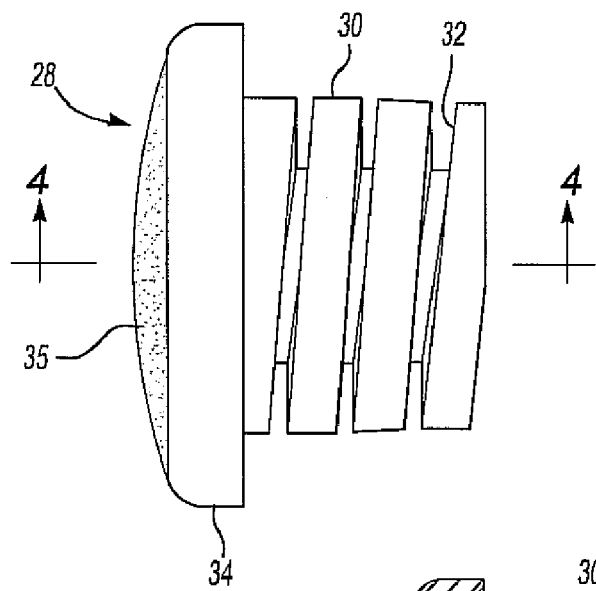
FIG. 3 is a side view of a preferred cushion.
Figure 4:
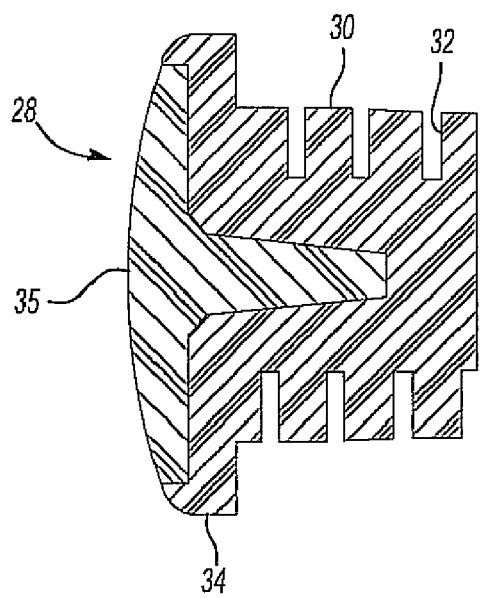
FIG. 4 is a longitudinal sectional view of the preferred cushion.
Figure 5:
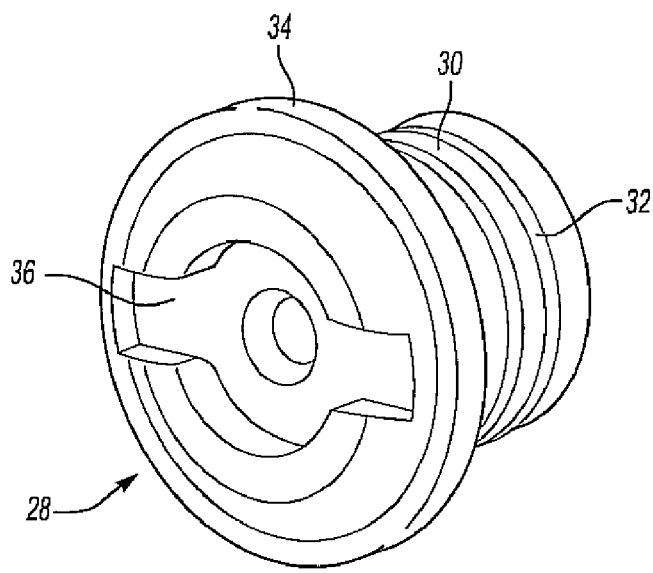
FIG. 5 is a perspective view of the preferred embodiment of the bumper.

With reference now particularly to FIGS. 3-5, a cushion 28 in accordance with the present invention is illustrated. This cushion 28 includes an elongated shank 30 having an externally threaded portion 32. The externally threaded portion 32 of the shank 30, furthermore, is complementary to the internally threaded hole 26 in the bracket 24 so that the threaded portion 32 of the cushion 28 threadably engages the bracket 24.

The cushion 28 preferably includes an enlarged head 34 at its forward end. An insert 35 is optionally mounted in the head 34 and this insert 35 includes a noncircular recess 36 (FIG. 5), such as a screwdriver slot. Consequently, a turning implement, such as a screwdriver, may be inserted into the recess 36 and used to rotate the cushion 28.

With reference to FIG. 2, in operation and with the hood 14 in a closed position, the turning implement is inserted into the recess 36 on the cushion head 34 and used to rotate the cushion shank 30. Rotation of the shank 30 thus varies the axial position of the cushion 28 relative to the body bracket 24, and thus the effective thickness of the cushion 28 between the bracket 24 and the grille 16 as shown in phantom line in FIG. 2.

In practice, the cushion 28 is rotated by the turning implement until the head 34 of the cushion 28 abuts against the grille 16. With the cushion 28 in abutment with the grille 16, flutter of the grille 16 during travel or manual deflection of the grille 16 is eliminated or at least minimized. Although in the preferred embodiment of the invention, one cushion 28 is provided between the vehicle body and each lower corner of the grille 16, fewer or more cushions 28 may be utilized without deviation from the spirit or scope of the invention. Similarly, although the cushion 28 is preferably of a two-piece construction of a resilient material, a one-piece construction of the bumper 28 as well as construction with a more rigid material may be utilized without deviation from the spirit or scope of the invention.

Having described my invention, however, many modifications thereto will become apparent to those skilled in the art to which it pertains without deviation from the spirit of the invention as defined by the scope of the appended claims.

I claim:

1. A cushion for an automotive grille mounted in an automotive body comprising:
    a shank having an enlarged head, said shank adapted to be sandwiched between the automotive grille and the automotive body; and
    a resilient insert mounted in said enlarged head of said shank;
    wherein said shank includes a threaded portion adapted to threadably engage a complementary threaded part in the automotive body so that rotation of said shank varies the effective thickness of the cushion between the automotive body and the grille.

2. The invention as defined in claim 1 wherein said threaded portion comprises an externally threaded portion of said shank.

3. The invention as defined in claim 2 and comprising a noncircular recess formed on said head, said recess dimensioned to receive an end of a turning implement.

4. The invention as defined in claim 1 wherein said shank is made of a resilient material.

5. An automotive vehicle comprising:
    a body;
    a hood pivotally mounted to said body and movable between an open and a closed position;
    a top of a grille attached to said hood;
    at least one cushion, said cushion including a cylindrical shank, an enlarged head, and a threaded portion, said enlarged head disposed at one end of said cylindrical shank, and said cushion sandwiched between a bottom of said grille and said body when said hood is in said closed position,
    said at least one cushion further including a resilient insert mounted in said enlarged head; and
    said threaded portion threadably engaging a complementary threaded part on the body so that rotation of said cushion varies the effective length of said cushion between said body and said grille.

6. The invention as defined in claim 5 wherein said threaded portion comprises an external thread formed on said cushion.

7. The invention as defined in claim 6 wherein said threaded part comprises an internally threaded hole in said body.

8. The invention as defined in claim 5 and comprising a noncircular recess formed on said head, said recess dimensioned to receive an end of a turning implement.

9. The invention as defined in claim 5 wherein said threaded portion comprises an external thread formed on said cylindrical shank.

10. The invention as defined in claim 5 wherein said cushion is made of a resilient material.

11. The invention as defined in claim 5 wherein said at least one cushion comprises a pair of spaced apart cushions.

12. The invention as defined in claim 11 wherein said grille comprises two lower corners and wherein one cushion is sandwiched between each lower corner of said grille and said body.

* * * * *

UNITED STATES PATENT AND TRADEMARK OFFICE
CERTIFICATE OF CORRECTION

PATENT NO. : 7,537,275 B2
APPLICATION NO. : 11/671639
DATED : May 26, 2009
INVENTOR(S) : Umesh Naik It is certified that error appears in the above-identified patent and that said Letters Patent is hereby corrected as shown below:

Column 2, line 45 replace "bracket 24" with --brackets 24--

Signed and Sealed this

Twenty-second Day of September, 2009

David J. Kappos
*Director of the United States Patent and Trademark Office*